United States Patent [19]

Verrill et al.

[11] 4,227,856

[45] Oct. 14, 1980

[54] REVERSE VELOCITY ROTOR SYSTEM FOR ROTORCRAFT

[75] Inventors: Thomas D. Verrill, Farmingdale; John R. Ewans, Shirley, both of N.Y.

[73] Assignee: The United States of America as represented by the Secretary of the Navy, Washington, D.C.

[21] Appl. No.: 924,101

[22] Filed: Jul. 12, 1978

[51] Int. Cl.³ .................... B64C 11/30; B64C 27/32
[52] U.S. Cl. ................................ 416/1; 416/114
[58] Field of Search ................... 416/1, 114, 115

[56] References Cited

U.S. PATENT DOCUMENTS

| | | | |
|---|---|---|---|
| 2,983,319 | 5/1961 | Kaman et al. | 416/115 |
| 3,031,017 | 4/1962 | Arcidiacono | 416/114 |
| 3,102,597 | 9/1963 | Drees | 416/114 |
| 3,144,908 | 8/1964 | Pascher | 416/114 |
| 3,572,616 | 3/1971 | Ulisnik | 416/114 |
| 3,729,272 | 4/1973 | Lemont | 416/114 |

*Primary Examiner*—John J. Vrablik
*Attorney, Agent, or Firm*—R. S. Sciascia; L. I. Shrago; C. E. Vautrain, Jr.

[57] ABSTRACT

A blade control method and means for helicopter rotors which increases helicopter speed by mixing two/rev. control motion with one/rev. cyclic and collective motion through mechanical summation is provided. Both rotary and vertical motions are imparted to an inner control shaft and these motions are combined to impart vertical oscillatory motions to the rotor head which motions increase the thrust developed by the helicopter rotor.

6 Claims, 6 Drawing Figures

REVERSE VELOCITY ROTOR SYSTEM FOR ROTORCRAFT

This invention concerns rotary wing aircraft and, more particularly, helicopters in which the pitch of the rotor blade is controlled by a two/rev. or higher order pitch control unit.

According to the theory of positive lift generation by the reverse velocity rotor principle, a conventional helicopter rotor turns clockwise as seen from below to generate lift and thrust. For a given helicopter forward airspeed and a given rotor rpm, the direction of the relative wind acting on the retreating rotor blade shifts at a given point on the blade to pass from the trailing edge to the leading edge of the retreating blade. The blade pitch angle of the advancing and retreating rotor blades remains substantially constant in forward flight but the increased lift imposed on the advancing blade causes it to flap upwardly thus decreasing its angle of attack. Conversely the retreating blade flaps downwardly, also increasing its angle of attack and thereby tending to equalize lift over the advancing and retreating blade sectors of rotor operation. A more detailed and exemplified description of the foregoing may be found in U.S. Pat. No. 3,729,272 issued Apr. 24, 1973 to Harold E. Lemont.

As the forward airspeed is increased beyond a given point for a given rotor rpm, the flapping action is inadequate to maintain substantial equality of lift over the two halves of the rotor disc. In this case the reverse airflow across the retreating blade creates negative lift on the inner portion of the blade and, depending on the forward speed, creates either a stalling condition or negative lift near the tip portions of the blade, the negative lift traveling outwardly across the blade as the airspeed increases.

This unstable condition could be corrected if the rotor rpm could be increased sufficiently to cause the airflow across the retreating blade to travel from the leading edge to the trailing edge. However, rotor rpm cannot be increased beyond the point at which the relative wind passing across the advancing blade causes compressibility Mach number problems. Thus, conventional helicopter rotors must be operated at airspeeds lower than those which cause reverse airflow across a substantial part of the retreating blade and at lower rpm's than those which would cause such Mach number problems. This has effectively limited forward airspeeds of helicopters to approximately 200 knots in existing aircraft. A two/rev. or higher order cyclic pitch input has been developed to provide better control of the blade pitch angle and angle of attack of the retreating blade. The present invention provides an alternative and improved method of obtaining twice-per-revolution or higher harmonic blade pitch control.

Accordingly, it is an object of the present invention to provide an improved rotor construction capable of substantially increasing the speed of helicopters.

Another object of this invention is to provide an improved rotor construction for obtaining twice-per-revolution or higher harmonic blade pitch control of helicopter rotors.

A further object of this invention is to provide for increased helicopter speed by mixing two/rev. control motion with one/rev. cyclic and collective motion through mechanical summation.

Other objects, advantages and novel features of the invention will become apparent from the following detailed description thereof when considered in conjunction with the accompanying drawings in which like numerals represent like parts throughout and wherein.

Figure 1:
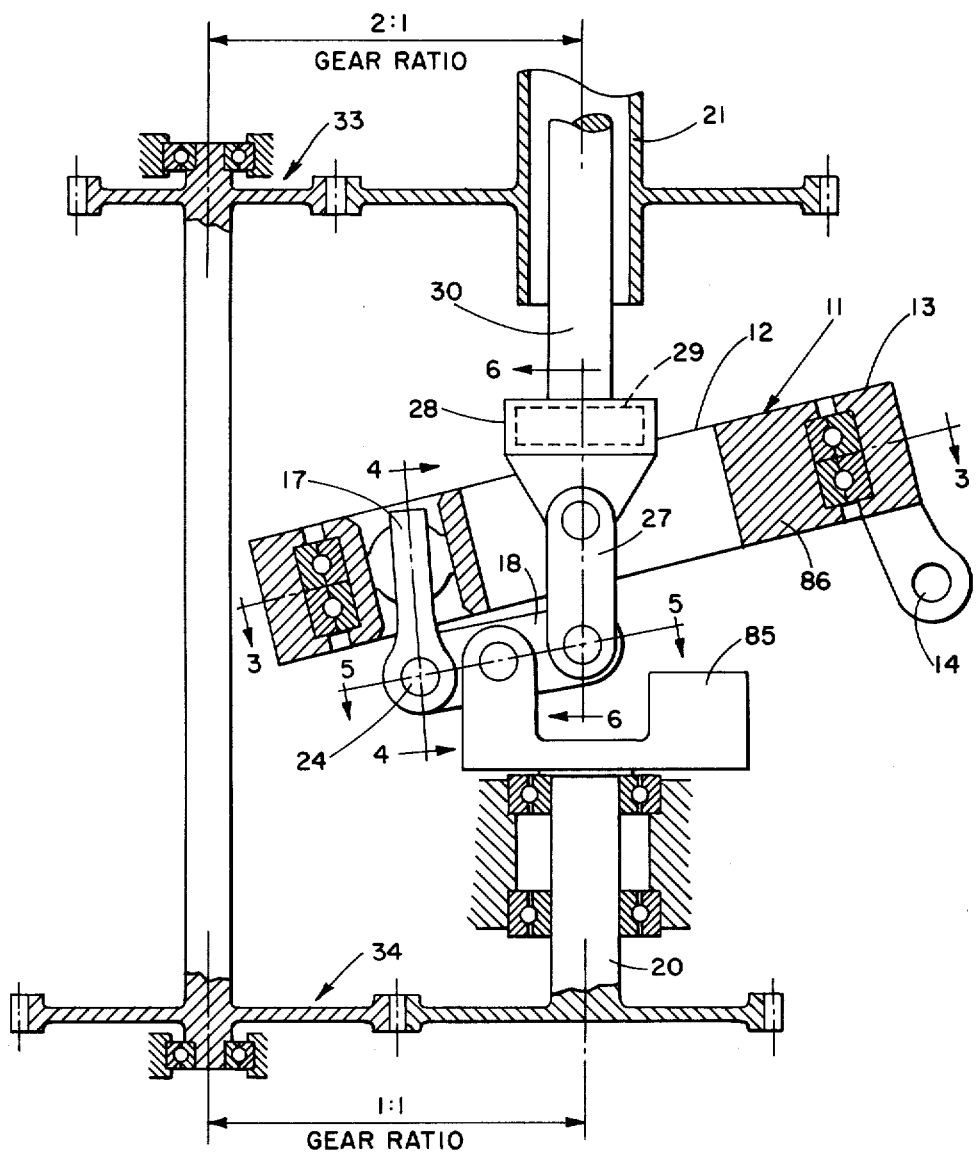
FIG. 1 is a front elevation partly in section of one embodiment of the invention for providing two/rev. motion of a helicopter rotor.
Figure 5:
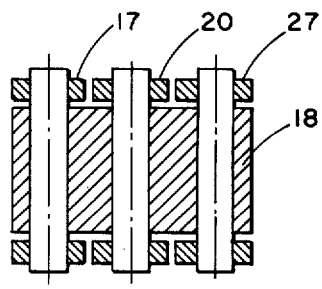
Figure 6:
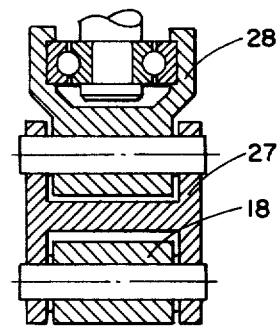

FIG. 5 is a sectional view of rocker arm 18 in FIG. 1 taken along a line substantially corresponding to line 5—5 therein; and FIG. 6 is a sectional view of the means coupling shaft 20 to column 30 in FIG. 1 taken along a line substantially corresponding to line 6—6 therein.

The present invention, in general, concerns a method and means for providing twice-per-revolution or higher harmonic blade pitch control of helicopter rotors by mounting a swashplate on the shaft driven by the main rotor shaft and varying the amplitude and phasing of the two/rev. motion by tilting the swashplate in either or both of two orthogonal directions for multiple phasing or mounting the swashplate on a single pair of hinges and tilting about these hinges for single phasing.

Referring to the drawings, FIG. 1 shows a swashplate 11 comprised of an inner ring 12 and an outer ring 13 which may be mounted on gimbals, not shown, or a spherical ball, not shown, and tilted in two orthogonal directions by two spaced actuators connected at a bearing 14. Inner ring 12 of swashplate 11 is driven by a link 17 that is pivoted on one end of a rocker arm 18. At all junctions between the links, etc., conventional spherical, ball, roller and/or journal bearings are used to allow required motions and prevent other motions. Rocker arm 18 is in turn driven by a shaft 20 which itself is driven at two/rev. or other harmonic of the rotor speed by gears or belt drive, not shown, from a main rotor shaft 21. Rocker arm 18 is driven by shaft 20 through bearings 24 and is connected at its other end to one end of a pair of links 27 of which only one is seen and whose other ends are attached to a collar 28 containing a thrust bearing 29. At the opposite side of the thrust bearing, a column 30 is mounted and concentrically positioned within rotor shaft 21. Thrust bearing 29 permits column 30 to rotate at the speed of the rotor shaft 21 while collar 28 and the components connected thereto rotate at twice the rate of revolution of the rotor. With shaft 20 rotating and swashplate 11 tilted, links 17 and 27 will perform appropriately sinusoidal oscillations in the vertical plane with a frequency dependent on the gearing between shaft 20 and main rotor shaft 21. A conventional gearing for providing a two-to-one ratio so as to produce the two/rev. frequency described is shown at 33 and 34.

Figure 2:
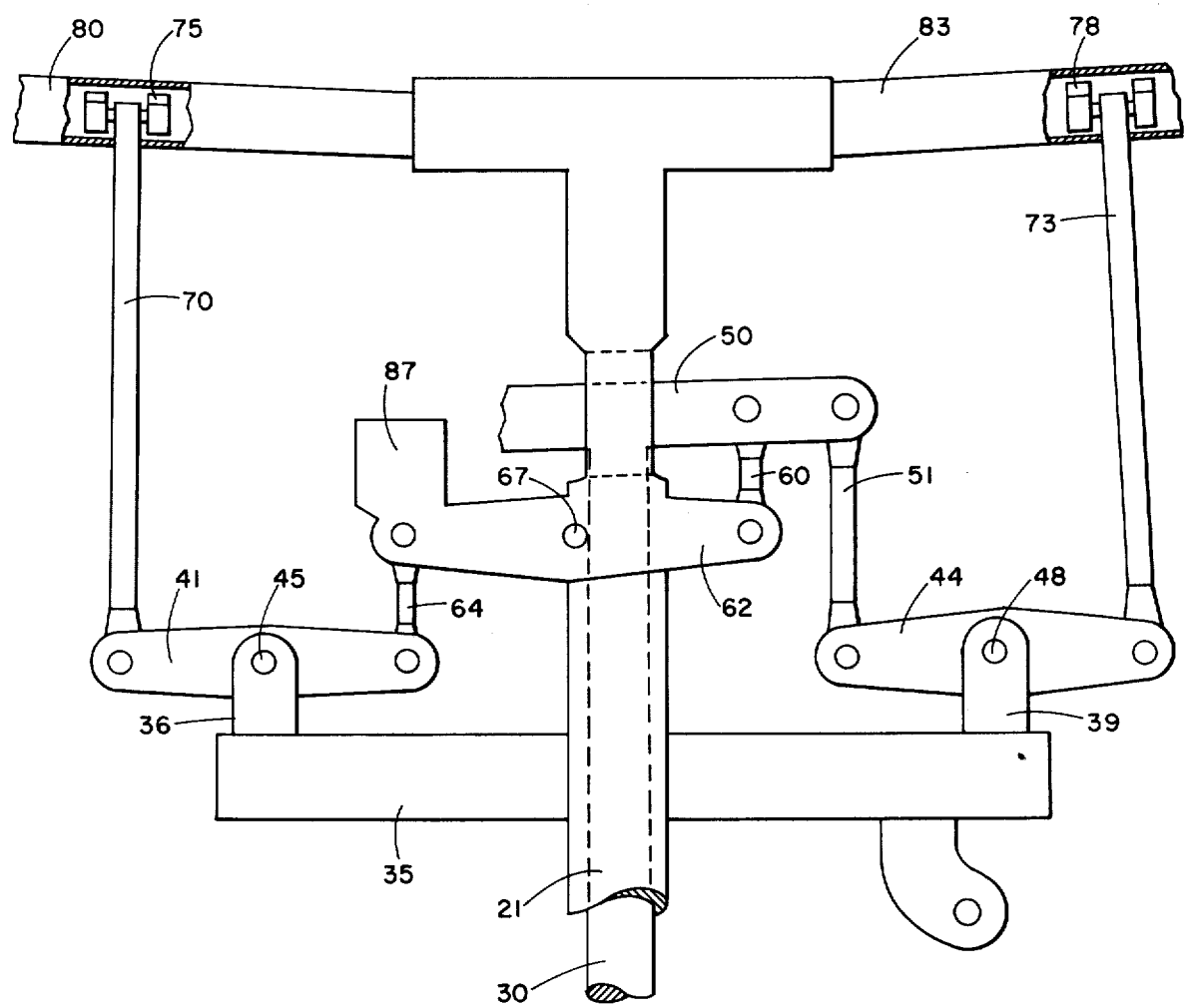
FIG. 2 is a front elevation partly in section of a means for mixing the two/rev. motion obtained by the embodiment of FIG. 1 with a helicopter's one/rev. cyclic and collective pitch motion.
Figure 3:
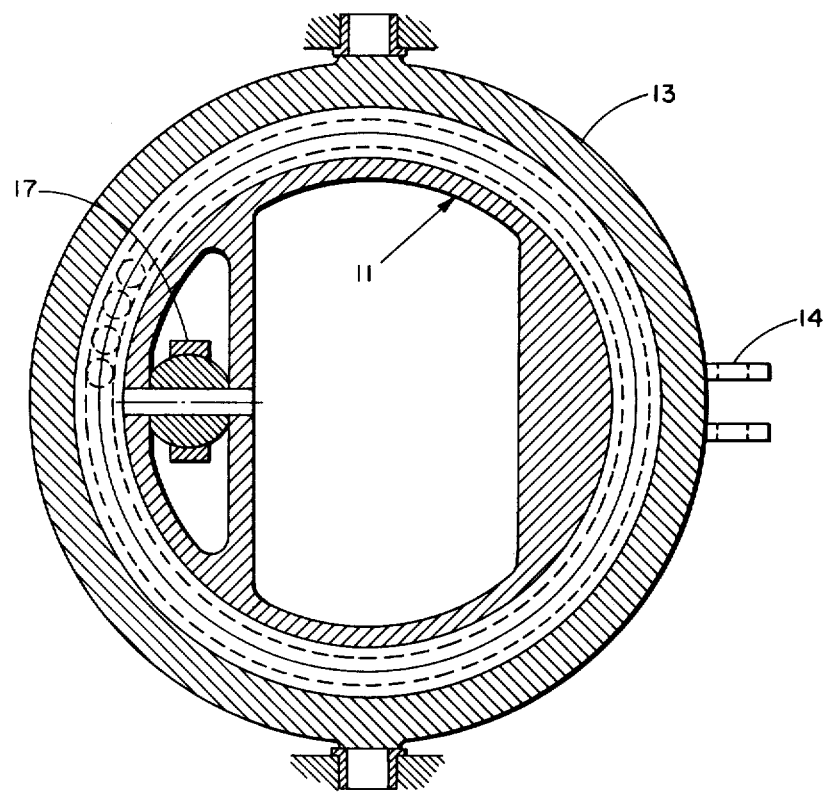
FIG. 3 is a sectional view of swashplate 11 in FIG. 1 taken along a line substantially corresponding to line 3—3 therein.
Figure 4:
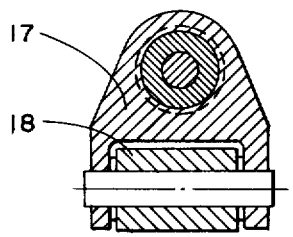
FIG. 4 is a sectional view of link 17 in FIG. 1 taken along a line substantially corresponding to line 4—4 therein.

With the two/rev. motion established, it is necessary to mix this motion with the conventional one-per-revolution cyclic and collective pitch motion. FIG. 2 shows one embodiment of a means for accomplishing this which is applicable to a 4-blade rotor. In FIG. 2, one/- rev. cyclic and collective pitch motion is provided by a sliding swashplate 35 which is operated in the conventional manner and carries four posts, 36–39, of which only 36 and 39 are seen, spaced at 90° intervals around the swashplate. Each of posts 36–39 carries a respective rocker arm, 41–44, on a pivot, 45–48 thereon, thus imparting one/rev. and collective motion to rocker arms 41–44. At the top of column 30 is rigidly attached a crosshead 50 which is coupled by link 51 directly to the rocker arm of two of the rotor blades one of which is seen and through a link 60, a rocker arm 62 and a link 64 to the rocker arms of the other two blades. Crosshead 50 passes through a slot, not seen, in shaft 21 which slot moves vertically with respect to crosshead 50 due to crosshead 50's attachment to column 30. Rotary motion of shaft 21 is imparted to column 30 via the slot walls and the sides of crosshead 50. Rocker arm 62 is pivoted on main rotor shaft 21 at bearing 67. FIGS. 3–6 are sectional views illustrating the link junctions.

The resulting motion of the outer ends of rocker arms 41–44 is the mechanical summation of the one/rev. cyclic pitch and the collective pitch and two/rev. control motions, and this resulting motion is transmitted via a plurality of pitch links 70–73 to respective pitch arms 75–78 on main rotor blades 80–83 of the helicopter. By locating the linkages shown on the left and right sides in FIG. 2 on two adjacent blades, and repeating this for the other two blades, the correct phase relationship is obtained between the two/rev. motions of the four blades. Balancing masses may be added at 85 and 86 in FIG. 1 and/or at 87 in FIG. 2 as required. Generally stated, rotary motion imparted to shaft 20 is combined with the vertical motion of collar 28 to impart vertical oscillatory motion to column 30, and the column 30 motion provides both cyclic flapping of the blades and cyclic pitch thereof to increase the forward thrust developed by the helicopter rotor.

What is claimed is:

1. A method of combining at least twice-per-revolution control motion with once-per-revolution cyclic and collective pitch motion in a helicopter to increase helicopter speed comprising:

oscillating a column with respect to the rotor hub at twice-per-revolution motion by sequentially tilting a first swashplate connected thereto in one direction and the opposite direction thereto;

varying the pitch of the rotor blades through reciprocally moving opposed blades via a second swashplate interconnecting a hollow rotor hub drive shaft and individual blades remote from the rotor hub;

rotating the first swashplate at at least twice the rate of revolution of the rotor hub by at least 2:1 gearing connecting the drive shaft and a rotatable first swashplate support; and supporting the second swashplate on the column partially traversing the drive shaft by a crosshead secured to the column and slidable in a slot in the drive shaft.

2. A system for providing twice-per-revolution or higher harmonic blade pitch control of a helicopter rotor having a rotor hub and a plurality of blades connected thereto for pitch changing movements relative thereto comprising:

a hollow drive shaft attached to said rotor hub and drive means for rotating said shaft, a pitch control column received in said shaft and linkage means connecting said column and said blades for imparting pitch movement to said blades;

rotatable support means for supporting said column and a swashplate mounted between said rotatable support means and said column for transmitting oscillatory motion thereto upon tilting of said swashplate;

means for tilting said swashplate; and means connecting said drive shaft and said rotatable support means for rotating said swashplate at at least twice the rate of revolution of said drive shaft, p1 said linkage means including a crosshead at the upper end of said column and said drive shaft having a vertical slot for slidably receiving said crosshead whereby once-per-revolution pitch motion and said at least twice-per-revolution motion are mixed and operate to increase rotor thrust.

3. The system as defined in claim 2 wherein said swashplate includes a rotatable inner ring and an outer supporting ring which includes said tilting means.

4. Apparatus for providing twice-per-revolution or higher harmonic blade pitch control of a helicopter rotor having a plurality of blades carried by a rotor hub mounted on a hollow drive shaft comprising:

means for driving said drive shaft at a selected rate of revolution;

a rotor column received in said drive shaft and terminating in a crosshead adjacent to said rotor hub, said drive shaft having an axially extending slot adapted to slidably receive said crosshead and to accomodate a selected axial reciprocating movement thereof;

an upper swashplate and means linking said swashplate to said rotor blades and to said crosshead for pitch control of said rotor blades;

a lower swashplate for imparting vertical reciprocating movement to said rotor column and means coupling said lower swashplate to said means for driving said drive shaft, said coupling means adapted to reciprocate said column at at least twice the rate of revolution of said drive shaft, whereby said blades are pitched to opposed positions at least twice during each revolution of the rotor hub.

5. The apparatus as defined in claim 4 wherein said coupling means includes a rocker arm mounted off center with respect to said drive shaft, a pair of connecting links centrally mounted with respect to the rotational axis of said drive shaft at one end of said rocker arm and a collar connected to said links, a link accomodating a ball joint therein mounted on the other end of said rocker arm, an inner ring having an opening for accomodating said collar mounted on and pivotable about said ball joint, an outer ring mounted on bearings for rotation about said inner ring, and a thrust bearing in said collar supporting said column; and means for tilting said lower swashplate, said means for tilting secured to said outer ring and including means for orthogonal tilting thereof so that rotation of said drive shaft will rotate said coupling means and said inner ring at twice the drive shaft rotation rate and cause a like rate of reciprocal motion of said column at an amplitude determined by the degree of tilt of said lower swashplate.

6. A rotor system for increasing helicopter speed comprising:

a rotor hub and a plurality of rotor blades connected thereto;

power means and drive means connected thereto for rotating said rotor hub;

pitch control means for collectively and cyclically varying the pitch of said blades; and reciprocating means connected to said pitch control means for vertically oscillating said pitch control means at at least twice the rate of revolution of said drive means, said pitch control means including pitch arms connected to each of said blades, a swashplate linked to said rotor hub, and link arms connecting said pitch arms and said swashplate, said reciprocating means including means for producing multiple phasing of said pitch control means including a second swashplate vertically aligned with said swashplate, a rotatable support for said second swashplate, gear means connecting said drive means and said rotatable support for driving said rotatable support at at least twice the rate of revolution of said drive means, and means for orthogonally tilting said second swashplate, whereby harmonic flapping and pitching of said blades is produced by a single power source.

* * * * *